(12) United States Patent
Sim et al.

(10) Patent No.: US 11,647,106 B2
(45) Date of Patent: May 9, 2023

(54) ELECTRONIC DEVICE INCLUDING CAMERA MODULE

(71) Applicant: Samsung Electronics Co., Ltd., Gyeonggi-do (KR)

(72) Inventors: Hyunwoo Sim, Gyeonggi-do (KR); Hyunchang Shin, Gyeonggi-do (KR); Byengsang Jung, Gyeonggi-do (KR); Seunggoo Kang, Gyeonggi-do (KR); Dongil Son, Gyeonggi-do (KR); Songhee Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 16/923,212

(22) Filed: Jul. 8, 2020

(65) Prior Publication Data
US 2021/0051221 A1    Feb. 18, 2021

(30) Foreign Application Priority Data
Aug. 16, 2019   (KR) .................. 10-2019-0100165

(51) Int. Cl.
*H04M 1/02*   (2006.01)
*H04N 5/225*   (2006.01)
(Continued)

(52) U.S. Cl.
CPC ........... *H04M 1/0264* (2013.01); *G02B 1/111* (2013.01); *G02B 5/3025* (2013.01);
(Continued)

(58) Field of Classification Search
CPC .. G02B 1/10; G02B 1/11; G02B 1/111; G02B 13/0035; G02B 13/006;
(Continued)

(56) References Cited

U.S. PATENT DOCUMENTS 9,578,149 B2   2/2017   Moon et al.
10,171,636 B2   1/2019   Yeo et al.
(Continued)

FOREIGN PATENT DOCUMENTS

CN   107229148 A   10/2017
CN   110109226 A   8/2019
(Continued)

OTHER PUBLICATIONS

International Search Report dated Oct. 30, 2020.
European Search Report dated Jun. 15, 2022.

*Primary Examiner* — Nelson M Rosario
(74) *Attorney, Agent, or Firm* — Cha & Reiter, LLC

(57) ABSTRACT

An electronic device is disclosed herein, including a housing having an inner space; a display disposed in the inner space and visible from an exterior, the display further including: a display panel having a first opening, at least one additional layer stacked under the display panel and having a second opening larger than the first opening, and a camera disposed in the inner space under the at least one additional layer, facing the second opening, and including: a lens housing, a plurality of lenses supported by the lens housing including a first lens closest to the display panel, and at least one image sensor, wherein the first lens either corresponds to an upper surface of the lens housing or at least partially protrudes from the upper surface of the lens housing.

20 Claims, 13 Drawing Sheets

(51) Int. Cl.
*G02B 1/111* (2015.01)
*G02B 5/30* (2006.01)

(52) U.S. Cl.
CPC ........ *H04M 1/0266* (2013.01); *H04N 5/2253* (2013.01); *H04N 5/2254* (2013.01); *H04M 2250/22* (2013.01)

(58) Field of Classification Search
CPC ........ G02B 27/286; G02B 5/003; G02B 5/30; G02B 5/3025; G02B 7/02; G02B 7/021; G03B 30/00; H04M 1/0264; H04M 1/0266; H04M 2250/22; H04N 5/2251; H04N 5/2253; H04N 5/2254; H04N 5/2257
See application file for complete search history.

(56) References Cited

U.S. PATENT DOCUMENTS

| | | |
|---|---|---|
| 2012/0105400 A1 | 5/2012 | Mathew et al. |
| 2015/0009400 A1 | 1/2015 | Shin et al. |
| 2016/0212311 A1* | 7/2016 | Mathew ................ G06F 1/1626 |
| 2018/0059512 A1 | 3/2018 | Rho et al. |
| 2018/0088631 A1 | 3/2018 | Park et al. |
| 2020/0007669 A1 | 1/2020 | Kwon |
| 2021/0181402 A1* | 6/2021 | Ota ...................... G02B 6/0051 |

FOREIGN PATENT DOCUMENTS

| | | |
|---|---|---|
| EP | 2611137 B1 | 8/2014 |
| KR | 10-2009-0061964 A | 6/2009 |
| KR | 10-2016-0097104 A | 8/2016 |
| KR | 10-2017-0112790 A | 10/2017 |
| WO | 2018/169102 A1 | 9/2018 |

* cited by examiner

ELECTRONIC DEVICE INCLUDING CAMERA MODULE

CROSS-REFERENCE TO RELATED APPLICATION(S)

This application is based on and claims priority under 35 U.S.C. 119 to Korean Patent Application No. 10-2019-0100165, filed on Aug. 16, 2019, in the Korean Intellectual Property Office, the disclosures of which are herein incorporated by reference in their entireties.

BACKGROUND

Field

The disclosure relates to an electronic device including a camera module.

Description of Related Art

With the growth of related technologies, a great variety of electronic devices such as mobile electronic devices has been developed and popularized. Recently, such electronic devices have tended to have a touch-sensitive display with a large-sized screen for wide visibility and convenient manipulation. Also, the electronic devices may each have at least one camera module. Typically, such a camera module is disposed around or through the display in the electronic device.

The above information is presented as background information only to assist with an understanding of the disclosure. Not determination has been made, and not assertion is made, as to whether any of the above might be applicable as prior art with regard to the disclosure.

SUMMARY

According to certain embodiments of the disclosure, an electronic device comprises a housing having an inner space; a display disposed in the inner space of the housing and visible from an outside of the housing, the display further comprising: a display panel having a first opening, and at least one additional layer stacked under the display panel and having a second opening corresponding to and larger than the first opening; and a camera module disposed in the inner space under the at least one additional layer, and facing the second opening, the camera module further comprising: a lens housing, a plurality of lenses disposed in and supported by the lens housing, the plurality of lenses comprising a first lens closest to the display panel, and at least one image sensor aligned with the plurality of lenses, wherein the first lens is disposed to coincide with an upper surface of the lens housing or at least partially protrude from the upper surface of the lens housing.

According to certain embodiments of the disclosure, an electronic device comprises a housing including a support member extended into an inner space thereof; a display disposed in the inner space to be visible from an outside, and including: a display panel having a first opening, and at least one additional layer stacked under the display panel and having a second opening corresponding to and larger than the first opening; and a camera module disposed in the inner space under the at least one additional layer and facing the second opening while being supported by at least a portion of the support member, and including: a lens housing, a plurality of lenses disposed in and supported by the lens housing, the plurality of lenses comprising a first lens closest to the display panel, and at least one image sensor aligned with the plurality of lenses, wherein the first lens is disposed to coincide with an upper surface of the lens housing or at least protrude from the upper surface of the lens housing.

According to certain embodiments of the disclosure, an electronic device comprises a housing having an inner space; a display disposed in the inner space of the housing and visible from an outside of the housing, and including: a display panel having a first opening, and at least one additional layer stacked under the display panel and having a second opening corresponding to and larger than the first opening; and a camera module disposed in the inner space to face the second opening, and including: a lens housing, a plurality of lenses disposed in and supported by the lens housing, and at least one image sensor aligned with the plurality of lenses, wherein the electronic device further comprises a light absorbing structure disposed on an inner surface of the first opening or from the inner surface of the first opening to an inner surface of the second opening.

BRIEF DESCRIPTION OF THE DRAWINGS

The above and other aspects, features, and advantages of certain embodiments of the disclosure will be more apparent from the following detailed description, taken in conjunction with the accompanying drawings.

DETAILED DESCRIPTION

Figure 1:
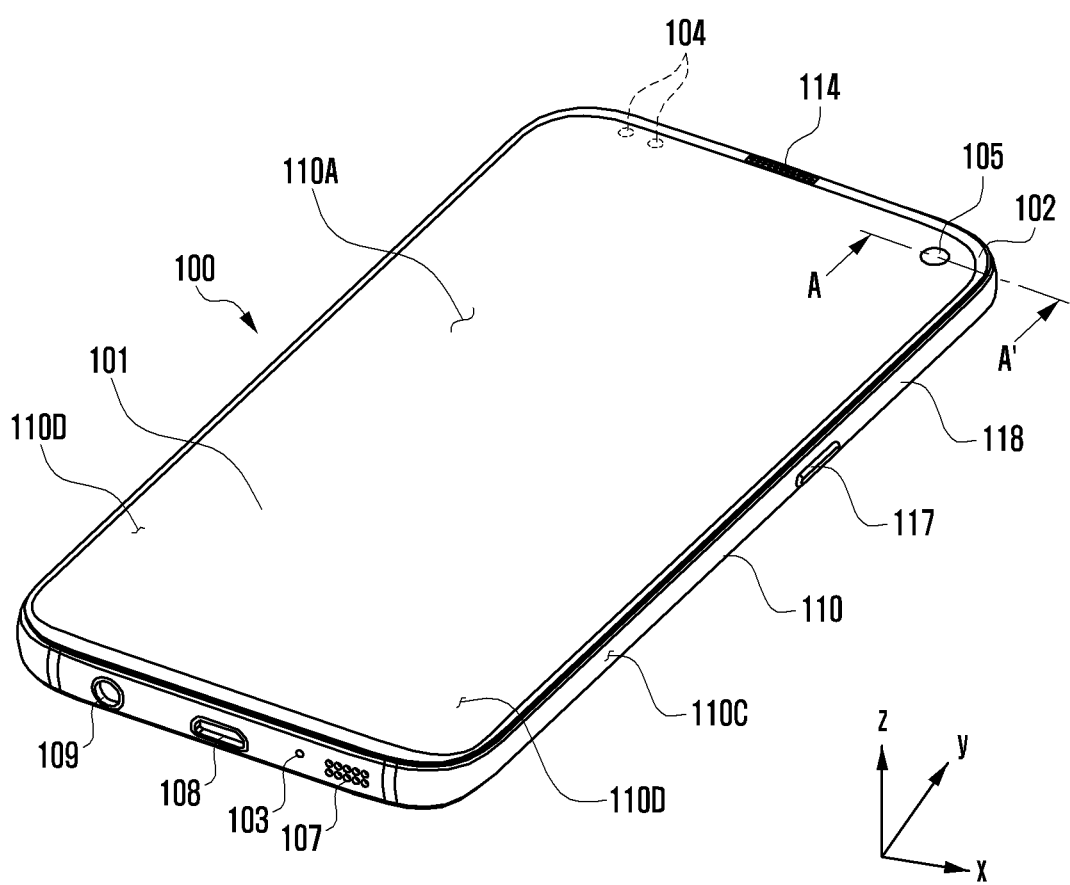
FIG. 1 is a perspective view showing a front surface of a mobile electronic device according to certain embodiments of the disclosure.

It has been found desirable to design the electronic device is to increase the area of the display as much as possible in the limited size of the electronic device while considering the arrangement of the camera module. Normally, the electronic device includes a display seen to the outside through at least a part of a front cover (also referred to as a front plate, a cover member, or glass window). The size of the display is gradually being increased so that the display is exposed through substantially the entire area of the front cover. In response to this trend of increasing size of a display area, the arrangement of various electronic components, e.g., at least one camera module, disposed through the front cover also needs to be changed accordingly. That is, it is becoming harder to dispose the camera in a black matrix (BM) area (or an inactive area) of the front cover, because the BM area is becoming smaller, if not eliminated.

One option is to dispose the camera in the display area. For the purposes of increasing the display area and smooth arrangement of the electronic components, the display and the front cover may have an opening (e.g., a punch hole or a perforated hole) and a camera-exposed portion, respectively, formed at a position corresponding to the camera module. Through the opening and the camera-exposed portion, the camera module may receive light from the outside and perform a camera function. However, the appearance of an opening in the display area is unappealing to the user, and it is, therefore, advantageous to design the opening to be as small as possible.

Generally, the size of the camera-exposed portion may be determined depending on the outer diameter of a barrel of the camera module. The barrel is a component of the camera module for accommodating and supporting a plurality of lenses. The barrel may be, however, confronted with limitations in reducing the overall outer diameter because of restrictions on the structural design for supporting the lens. This may cause a difficulty in reducing the size of the camera-exposed portion formed in the front cover. In addition, when the camera-exposed portion of the front cover is spaced apart from the lens of the camera module, a phenomenon may arise whereby light is reflected by a component on the side of the camera lens. This is unfavorable because the reflected light may be visually recognized from the outside.

Certain embodiments of the disclosure may provide an electronic device including a camera module.

Certain embodiments of the disclosure may provide an electronic device that includes a camera module configured to have a reduced camera-exposed portion without reducing a view angle.

Certain embodiments of the disclosure may provide an electronic device that includes a camera module having a relatively small camera-exposed portion that can contribute to an increase in size of a display area.

The following description with reference to the accompanying drawings is provided to assist in a comprehensive understanding of certain embodiments of the disclosure as defined by the claims and their equivalents. It includes various specific details to assist in that understanding but these are to be regarded as merely exemplary. Accordingly, those of ordinary skill in the art will recognize that various changes and modifications of the certain embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of certain embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 to 11C, discussed below, and the certain embodiments used to describe the principles of the disclosure in this patent document are by way of illustration only and should not be construed in any way to limit the scope of the disclosure. Those skilled in the art will understand that the principles of the disclosure may be implemented in any suitably arranged system or device.

Hereinafter, embodiments of the disclosure are described in detail with reference to accompanying drawings.

Figure 2:
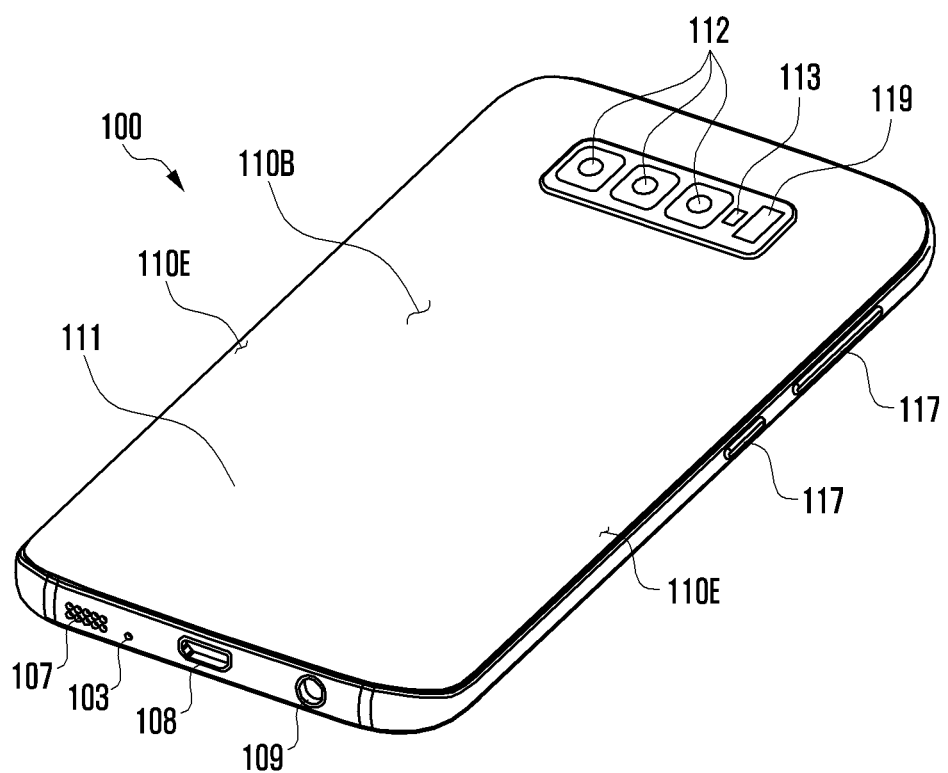
FIG. 2 is a perspective view showing a rear surface of the mobile electronic device shown in FIG. 1.
Figure 3:
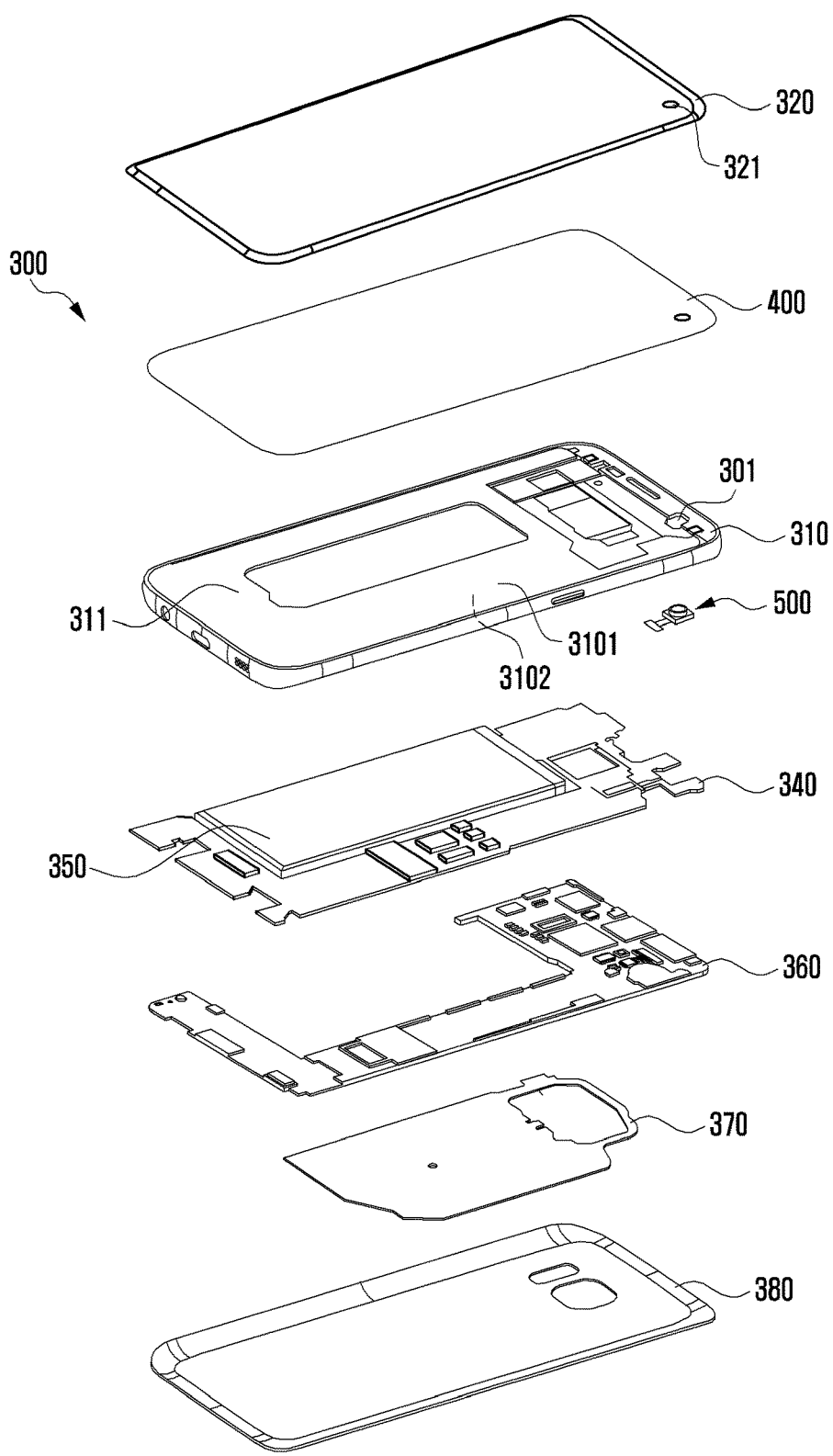
FIG. 3 is an exploded perspective view showing the mobile electronic device shown in FIGS. 1 and 2.

FIGS. 1 and 2 describe the exterior of an electronic device where certain embodiments of the disclosure can be practiced. FIG. 3 describes the interior of the electronic device. FIGS. 4-12 describe an arrangement relationship between the display and the camera module in the electronic device.

Figure 4:
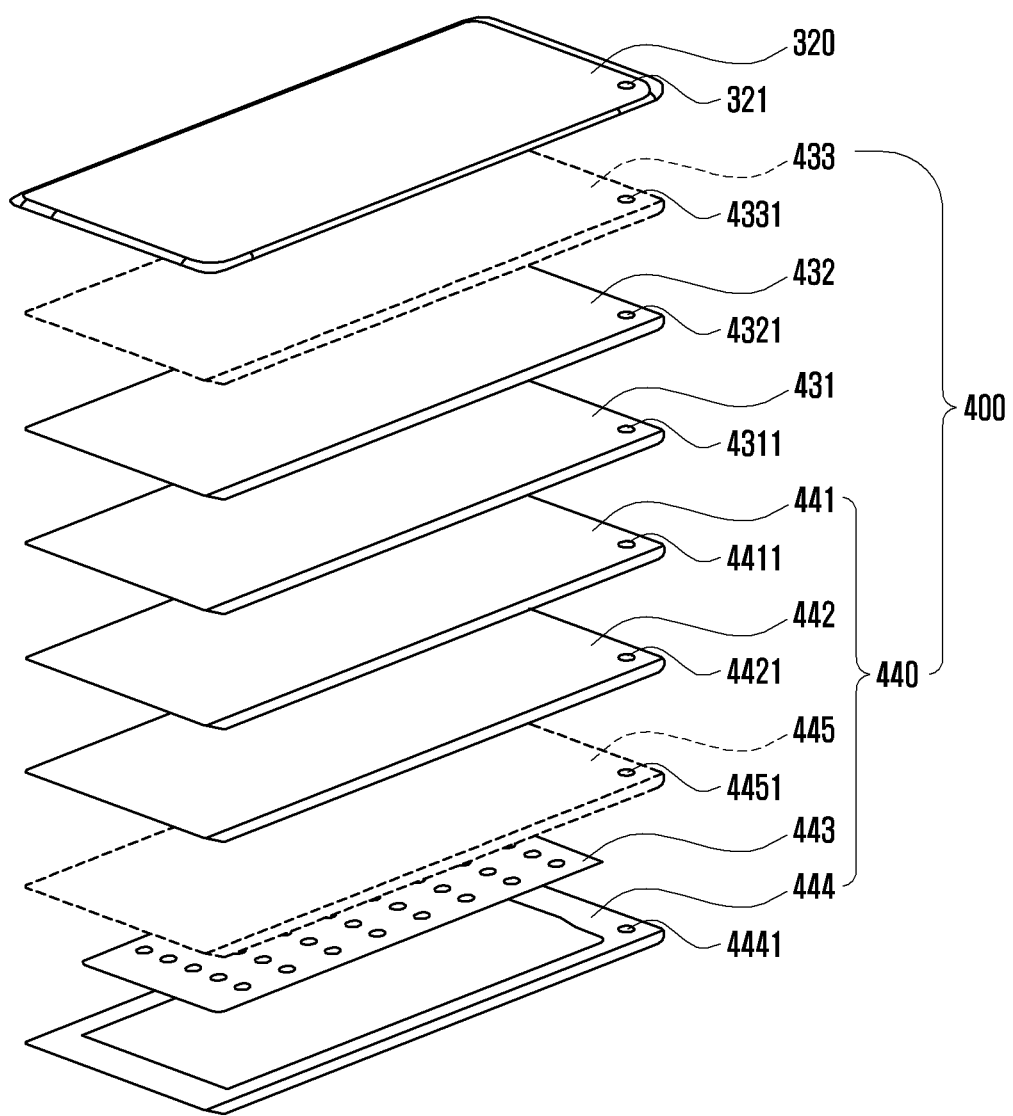
FIG. 4 is an exploded perspective view showing a display according to certain embodiments of the disclosure.

FIG. 4 discloses a display 400 which includes, among other things, a display panel 431, and a polarizing layer POL 432, as well as one or more additional layers 441, 442. The display panel 431 and POL have through-holes 4321 and 4311, respectively having a first size. The through-holes are disposed at a location corresponding to the location of the camera module. The additional layers 441, 442, have through-holes 4411, 4421 that are larger than the first size that also correspond to the location of the camera module.

FIG. 5A-FIG. 9 discloses a cross-sectional view. The camera module 500 includes an image sensor 540, and a plurality of lenses 530 disposed in a lens housing 520. Lens 531 that is closest to the display panel 432 at least partially coincides or protrudes from the lens housing.

Electronic Device

FIG. 1 illustrates a perspective view showing a front surface of a mobile electronic device according to an embodiment of the disclosure, and FIG. 2 illustrates a perspective view showing a rear surface of the mobile electronic device shown in FIG. 1 according to an embodiment of the disclosure.

Referring to FIGS. 1 and 2, a mobile electronic device 100 may include a housing 110 that includes a first surface (or front surface) 110A, a second surface (or rear surface) 110B, and a lateral surface 110C that surrounds a space between the first surface 110A and the second surface 110B. The housing 110 may refer to a structure that forms a part of the first surface 110A, the second surface 110B, and the lateral surface 110C. The first surface 110A may be formed of a front plate 102 (e.g., a glass plate or polymer plate coated with a variety of coating layers) at least a part of which is substantially transparent. The second surface 110B may be formed of a rear plate 111 which is substantially opaque. The rear plate 111 may be formed of, for example, coated or colored glass, ceramic, polymer, metal (e.g., aluminum, stainless steel (STS), or magnesium), or any combination thereof. The lateral surface 110C may be formed of a lateral bezel structure (or "lateral member") 118 which is combined with the front plate 102 and the rear plate 111 and includes a metal and/or polymer. The rear plate 111 and the lateral bezel structure 118 may be integrally formed and may be of the same material (e.g., a metallic material such as aluminum).

The front plate 102 may include two first regions 110D disposed at long edges thereof, respectively, and bent and extended seamlessly from the first surface 110A toward the rear plate 111. Similarly, the rear plate 111 may include two second regions 110E disposed at long edges thereof, respectively, and bent and extended seamlessly from the second surface 110B toward the front plate 102. The front plate 102 (or the rear plate 111) may include only one of the first regions 110D (or of the second regions 110E). The first regions 110D or the second regions 110E may be omitted in part. When viewed from a lateral side of the mobile electronic device 100, the lateral bezel structure 118 may have a first thickness (or width) on a lateral side where the first region 110D or the second region 110E is not included, and may have a second thickness, being less than the first thickness, on another lateral side where the first region 110D or the second region 110E is included.

The mobile electronic device 100 may include at least one of a display 101, audio modules 103, 107 and 114, sensor modules 104 and 119, camera modules 105, 112 and 113, a key input device 117, a light emitting device, and connector holes 108 and 109. The mobile electronic device 100 may omit at least one (e.g., the key input device 117 or the light emitting device) of the above components, or may further include other components.

The display 101 may be exposed through a substantial portion of the front plate 102, for example. At least a part of the display 101 may be exposed through the front plate 102 that forms the first surface 110A and the first region 110D of the lateral surface 110C. Outlines (i.e., edges and corners) of the display 101 may have substantially the same form as those of the front plate 102. The spacing between the outline of the display 101 and the outline of the front plate 102 may be substantially unchanged in order to enlarge the exposed area of the display 101.

A recess or opening may be formed in a portion of a display area of the display 101 to accommodate at least one of the audio module 114, the sensor module 104, the camera module 105, and the light emitting device. At least one of the audio module 114, the sensor module 104, the camera module 105, a fingerprint sensor (not shown), and the light emitting element may be disposed on the back of the display area of the display 101. The display 101 may be combined with, or adjacent to, a touch sensing circuit, a pressure sensor capable of measuring the touch strength (pressure), and/or a digitizer for detecting a stylus pen. At least a part of the sensor modules 104 and 119 and/or at least a part of the key input device 117 may be disposed in the first region 110D and/or the second region 110E.

The audio modules 103, 107 and 114 may correspond to a microphone hole 103 and speaker holes 107 and 114, respectively. The microphone hole 103 may contain a microphone disposed therein for acquiring external sounds and, in a case, contain a plurality of microphones to sense a sound direction. The speaker holes 107 and 114 may be classified into an external speaker hole 107 and a call receiver hole 114. The microphone hole 103 and the speaker holes 107 and 114 may be implemented as a single hole, or a speaker (e.g., a piezo speaker) may be provided without the speaker holes 107 and 114.

The sensor modules 104 and 119 may generate electrical signals or data corresponding to an internal operating state of the mobile electronic device 100 or to an external environmental condition. The sensor modules 104 and 119 may include a first sensor module 104 (e.g., a proximity sensor) and/or a second sensor module (e.g., a fingerprint sensor) disposed on the first surface 110A of the housing 110, and/or a third sensor module 119 (e.g., a heart rate monitor (HRM) sensor) and/or a fourth sensor module (e.g., a fingerprint sensor) disposed on the second surface 110B of the housing 110. The fingerprint sensor may be disposed on the second surface 110B as well as the first surface 110A (e.g., the display 101) of the housing 110. The electronic device 100 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112 and 113 may include a first camera device 105 disposed on the first surface 110A of the electronic device 100, and a second camera device 112 and/or a flash 113 disposed on the second surface 110B. The camera module 105 or the camera module 112 may include one or more lenses, an image sensor, and/or an image signal processor. The flash 113 may include, for example, a light emitting diode or a xenon lamp. Two or more lenses (infrared cameras, wide angle and telephoto lenses) and image sensors may be disposed on one side of the electronic device 100.

The key input device 117 may be disposed on the lateral surface 110C of the housing 110. The mobile electronic device 100 may not include some or all of the key input device 117 described above, and the key input device 117 which is not included may be implemented in another form such as a soft key on the display 101. The key input device 117 may include the sensor module disposed on the second surface 110B of the housing 110.

The light emitting device may be disposed on the first surface 110A of the housing 110. For example, the light emitting device may provide status information of the electronic device 100 in an optical form. The light emitting device may provide a light source associated with the operation of the camera module 105. The light emitting device may include, for example, a light emitting diode (LED), an IR LED, or a xenon lamp.

The connector holes 108 and 109 may include a first connector hole 108 adapted for a connector (e.g., a universal serial bus (USB) connector) for transmitting and receiving power and/or data to and from an external electronic device, and/or a second connector hole 109 adapted for a connector (e.g., an earphone jack) for transmitting and receiving an audio signal to and from an external electronic device.

Some sensor modules 105 of camera modules 105 and 212, some sensor modules 104 of sensor modules 104 and 119, or an indicator may be arranged to be exposed through a display 101. For example, the camera module 105, the sensor module 104, or the indicator may be arranged in the internal space of an electronic device 100 so as to be brought into contact with an external environment through an opening of the display 101, which is perforated up to a front plate 102. In another embodiment, some sensor modules 104 may be arranged to perform their functions without being visually exposed through the front plate 102 in the internal space of the electronic device. For example, in this case, an area of the display 101 facing the sensor module may not require a perforated opening.

As can be seen in FIG. 1, the display 101 consumes almost the entirety of the first surface 110A. Therefore, the camera module 105 is disposed in the display area. The camera module receives light from the outside through an opening that is disposed at a position corresponding to the camera. However, if the opening is large, it noticeably interrupts the display and is unpleasant to the viewer. At the same time, the size of the hole generally depends on the outer diameter of a barrel of the camera module. In certain embodiments of the disclosure, the size of the opening is a size that is acceptably small to not unacceptably interrupt the display, while allowing a high level of functionality for the camera module 105.

FIG. 3 illustrates an exploded perspective view showing a mobile electronic device shown in FIG. 1 according to an embodiment of the disclosure.

Referring to FIG. 3, a mobile electronic device 300 may include a lateral bezel structure 310, a first support member 311 (e.g., a bracket), a front plate 320, a display 400, an electromagnetic induction panel (not shown), a printed circuit board (PCB) 340, a battery 350, a second support member 360 (e.g., a rear case), an antenna 370, and a rear plate 380. The mobile electronic device 300 may omit at least one (e.g., the first support member 311 or the second support member 360) of the above components or may further include another component. Some components of the electronic device 300 may be the same as or similar to those of the mobile electronic device 100 shown in FIG. 1 or FIG. 2, thus, descriptions thereof are omitted below.

The first support member 311 is disposed inside the mobile electronic device 300 and may be connected to, or integrated with, the lateral bezel structure 310. The first support member 311 may be formed of, for example, a metallic material and/or a non-metal (e.g., polymer) material. The first support member 311 may be combined with the display 400 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 310 and/or the first support member 311.

The first support member 311 of the lateral member 310 may include a first surface 3101 and a second surface 3102. The first surface 3101 faces the front plate 320, and the second surface 3102 faces the rear plate 380 and is opposite to the first surface 3101. A camera module 500 (e.g., the camera module 105 in FIG. 1) may be disposed between the first support member 311 and the rear plate 380.

The camera module 500 may protrude or be exposed toward the front plate 320 through a through-hole 301. The through-hole 301 is formed from the first surface 3101 to the second surface 3102 of the first support member 311. A portion of the camera module 500 that protrudes through the through-hole 301 may be disposed to be close to a rear surface of the front plate 320 through at least one opening (e.g., a first opening OP1 and a second opening OP2 in FIG. 5A). The at least one opening is formed at a corresponding position of the display 400.

In another embodiment where the camera module 500 can be disposed between the display 400 and the first support member 311. In the foregoing, the through-hole 301 may be unnecessary. According to an embodiment, the camera module 500 may be disposed at least in part within both the through-hole 301 of the first support member 311 and the at least one opening OP1 and OP2 of the display 400. The camera-exposed portion 321 formed at a corresponding position of the front plate 320 can detect an external environment. According to an embodiment, the camera-exposed portion 321 may include a transparent region substantially facing an effective area of a lens (e.g., a first lens 531 in FIG. 5A) of the camera module 500, and a printed region (e.g., a printed region 322 in FIG. 5A) having a predetermined width and surrounding the transparent region.

Hereinafter, an arrangement relationship between the display 400 and the camera module 500 in the electronic device 300 will be described in detail.

FIG. 4 is an exploded perspective view illustrating a display 400 according to certain embodiments of the disclosure. The display 400 comprises a display panel 431, a polarizer 432, and at least one additional layer 440 which can include polymer members 441, 442, a functional member 443, and a conductive member 444, among other layers. The display panel 431 and polarizer 432 include openings 4331 and 4321 of a first size, respectively that correspond to the position of the camera module 500. Layers 441, 442, 444, and 445 can include openings 4411, 4421, 4441, and 4451 of a second size larger than the first size that correspond to the position of the camera module 500.

The display 400 shown in FIG. 4 may be similar, at least in part, to the display 101 shown in FIG. 1, or may include other embodiments of the display.

Referring to FIG. 4, the display 400 may include a display panel 431 and a polarizer (POL) 432 (e.g., a polarizing film) disposed through an adhesive member on a rear surface of the front cover 320 (also referred to as a front plate, a glass plate, or a cover member), and at least one additional layer 440 attached to a rear surface of the display panel 431. According to an embodiment, the adhesive member may include an optical clear adhesive (OCA), a pressure sensitive adhesive (PSA), a heat-reactive adhesive, a normal adhesive, or a double-sided tape.

Figure 5A:
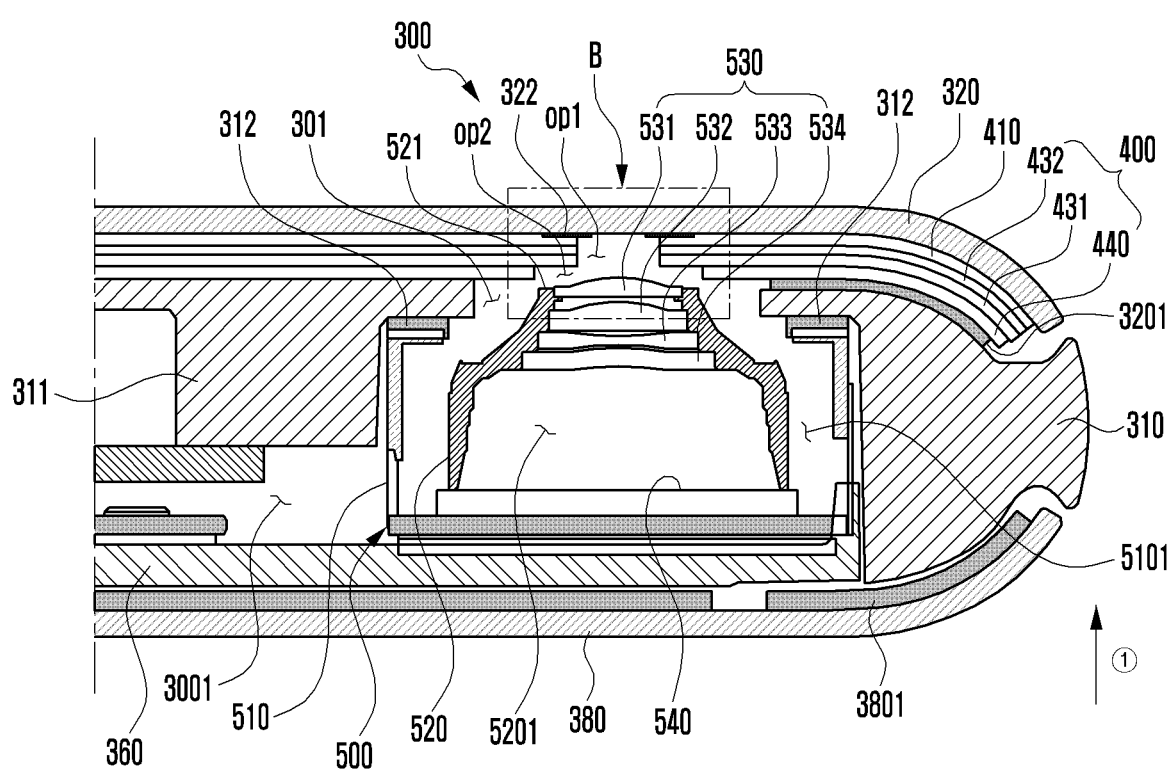
FIG. 5A is a cross-sectional view partially showing the electronic device by being taken along the line A-A' of FIG. 1.

The front cover 320 may have the camera-exposed portion 321 disposed at a position corresponding to a camera module (e.g., the camera module 500 in FIG. 5A). In certain embodiments, the camera-exposed portion 321 may be disposed in a black matrix (BM) area, e.g., a printed region 322 in FIG. 5A, that surrounds the camera-exposed portion 321. In other embodiments, the size or shape of the printed region 322 may be determined depending on the angle of view of the camera module 500. In another embodiment, the front cover 320 may have only the camera-exposed portion 321 without the printed region.

According to certain embodiments, the display panel 431 and the POL 432 may be integrally formed. The display 400 may include a control circuit (not shown). The control circuit may include a flexible printed circuit board (FPCB) for electrically connecting a main board (e.g., the PCB 340 in FIG. 3) of an electronic device (e.g., the electronic device 300 in FIG. 3) and the display panel 431, and a display driver IC (DDI) mounted on the FPCB. According to an embodiment, the display 400 may further include a touch panel 433. In an embodiment where the display 400 operates as a touch display of an in-cell or on-cell type (depending on the arrangement position of the touch panel 433), the control circuit may include a touch display driver IC (TDDI). In another embodiment, the display 400 may also include a fingerprint sensor (not shown) disposed near the control circuit. According to an embodiment, the fingerprint sensor may include an ultrasonic or optical fingerprint sensor capable of recognizing, through a hole formed at least partially in some of components of the display 400, a fingerprint of a finger that is in contact with or close to the outer surface of the front cover 320.

According to certain embodiments, the at least one additional layer 440 may include one or more polymer members 441 and 442 disposed on the rear surface of the display panel 431, at least one functional member 443 disposed on the rear surface of the polymer members 441 and 442, and a conductive member 444 disposed on the rear surface of the at least one functional member 443. The one or more polymer members 441 and 442 may include an embossing layer 441 for removing air bubbles that may occur between the display panel 431 and underlying layers, and/or a cushion layer 442 for relieving a shock. The at least one functional member 443 may include, for example, a graphite sheet for heat dissipation, an added display, a force-touch FPCB, a fingerprint sensor FPCB, a communication antenna radiator, a heat dissipation sheet, a conductive/non-conductive tape, and/or an open cell sponge. The conductive member 444 may be a metal plate used for reinforcing the rigidity of an electronic device (e.g., the electronic device 300 in FIG. 3), shielding ambient noise, and dissipating heat released from surrounding components. In an embodiment, the conductive member 444 may include copper (Cu), aluminum (Al), stainless steel (SUS), or a clad (i.e., a laminated stack of different kinds of metals such as SUS and Al). In another embodiment, the display 400 may further include a detection member 445 for detecting an input action by a writing member (e.g., an electronic pen) of an electromagnetic induction type. According to an embodiment, the detection member 445 may include a digitizer. According to an embodiment, the detection member 445 may be disposed between the lower polymer member 442 and the functional member 443. In another embodiment, the detection member 445 may be disposed between the display panel 431 and the upper polymer member 441.

The front cover 320 may have the camera-exposed portion 321 that is formed at a position overlapped at least in part with the display panel 431 when the front cover 320 is viewed from above. The display panel 431 may have a first opening 4311 (e.g., a first opening OP1 in FIG. 5A) formed at a position overlapped with the camera-exposed portion 321 when the front cover 320 is viewed from above. The first opening OP1 may include openings 4321 and 4331 formed in the POL 432 and/or the touch panel 433 attached to the display panel 431. The first opening OP1 may also include an opening formed in an adhesive member (e.g., an adhesive member 410 in FIG. 5A) that attaches the POL 432 or the touch panel 433 to the front cover 320. According to an embodiment, when the front cover 320 is viewed from above, the at least one additional layer 440 may include at least one second opening 4411, 4421, 4441, and 4451 (e.g., a second opening OP2 in FIG. 5A) formed to be overlapped at least in part with the first opening 4311. According to an embodiment, the second opening OP2 may be formed larger than the first opening OP1.

The camera module (e.g., the camera module 500 in FIG. 3) of the electronic device (e.g., the electronic device 300 in FIG. 3), a front end supporting structure of a lens housing (e.g., a lens housing 520 in FIG. 5A) (e.g., a barrel) for supporting a first lens (e.g., a first lens 531 in FIG. 5A) disposed closest to the display 400 includes an arrangement structure (e.g., a stepped structure) of the first and second openings OP1 and OP2 of the display 400 to form an angle of view. Therefore, the size of the first opening OP1 formed in the display panel 431 may be reduced. As a result, this may help to reduce the camera-exposed portion 321 of the front cover 320.

Figure 5B:
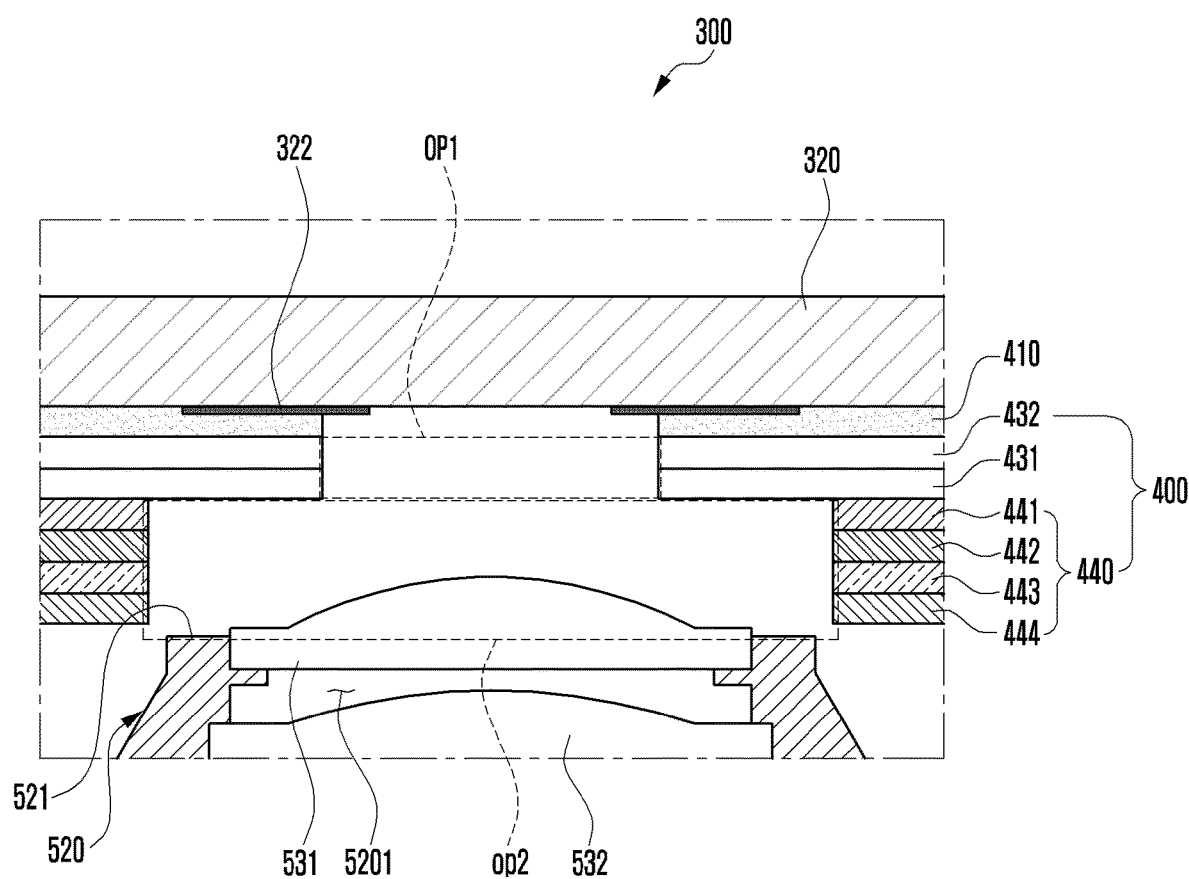
FIG. 5B is an enlarged view showing a region B of FIG. 5A.

FIG. 5A is a cross-sectional view partially showing the electronic device by being taken along the line A-A' of FIG. 1. In addition, FIG. 5B is an enlarged view showing a region B of FIG. 5A.

The camera module 500 may be supported by second support member 360 disposed on the rear cover 380. The camera module 500 may include an image sensor 540 at the bottom, generally proximate the second support member 360. The image sensor 540 is configured to generate an electronic image corresponding to a view through an opening op1 in the display panel 431 and POL 432 from the vantage point of the image sensor 540.

The camera module 500 includes a plurality of lenses 530 in a lens housing 520. The plurality of lenses 530 includes at first lens 531 which is closest to the opening op1. The first lens 531 protrudes from the lens housing 520, such that at least a part of the flat portion of the first lens 531 is closer to the opening op1 than the top surface 521 of the lens housing 520.

The diameter of the lens housing 520 and the plurality of lenses 530 is larger than the diameter of the opening op1 in the display panel 431. However, at least one additional layer 440 disposed below the display panel 431 has a second opening op2 that is larger than the opening in the display panel 431. One of the lenses 531 can protrude into the second opening op2.

Referring to FIG. 5A, the electronic device 300 may include the front cover 320 (also referred to as a cover member, a front plate, a front window, or a first plate) facing a first direction (denoted by ①), the rear cover 380 (also referred to as a rear cover member, a rear plate, a rear window, or a second plate) facing a direction opposite to the front cover 320, and the lateral member 310 surrounding an inner space 3001 between the front cover 320 and the rear cover 380. The electronic device 300 may further include a first waterproof member 3201 disposed between the additional layer 440 of the display 400 and the lateral member 310. The electronic device 300 may include a second waterproof member 3801 disposed between the lateral member 310 and the rear cover 380. The first waterproof member 3201 and the second waterproof member 3801 may prevent foreign matter or moisture from entering the inner space 3001 of the electronic device 300. In another embodiment, such a waterproof member may be disposed on at least a portion of a mounting support structure between the camera module 500 and the lateral member 310. The lateral member 310 may further include the first support member 311 extended at least in part into the inner space 3001 of the electronic device 300. The first support member 311 may be formed by a structural coupling with the lateral member 310. The first support member 311 may support the camera module 500 to be disposed near both the first opening OP1 of the display panel 431 and the second opening OP2 of the additional layer 440.

The camera module 500 may include a camera housing 510, a lens housing 520, a plurality of lenses 530 (i.e., 531, 532, 533, and 534), and at least one image sensor 540. The camera housing 510 may be formed to have an inner space 5101. The lens housing 520 may be formed to have an inner space 5201, disposed in the inner space 5101 of the camera housing 510, and protruding at least partially in a display direction (denoted by ①). The plurality of lenses 530 may be disposed at regular intervals in the inner space 5201 of the lens housing 520. The at least one image sensor 540 may be disposed in the inner space 5101 of the camera housing 510 to be aligned with the plurality of lenses 530. When the camera module 500 has an auto focus (AF) function, the lens housing 520 may move in the camera housing 510 through a certain driver so that a distance from the display panel 431 is variable. In one embodiment, the camera module 500 may not have the camera housing 510, and the lens housing 520 may be directly disposed on the first support member 311 through an alignment process.

According to certain embodiments, the camera module 500 may be aligned with the second opening OP2 of the display 400 through a through-hole 301 of the first support member 311 and then attached to the rear surface of the first support member 311 through an adhesive member 312 (e.g., a bonding member or a tape member).

According to certain embodiments, the display 400 may include a touch panel (e.g., the touch panel 433 in FIG. 4), the POL 432, the display panel 431, the embossing layer 441, a cushion layer (e.g., the cushion layer 442 in FIG. 4), a digitizer (e.g., the digitizer 445 in FIG. 4), a functional member (e.g., the functional member 443 in FIG. 4), and/or a conductive member (e.g., the conductive member 444 in FIG. 4). According to certain embodiments, the camera module 500 may be supported by the second support member 360 (e.g., a rear case).

Referring to FIGS. 5A and 5B, the electronic device 300 may include the adhesive member 410, the POL 432, the display panel 431, and the additional layer 440, which are sequentially disposed between the lateral member 310 and the rear surface of the front cover 320. According to an embodiment, when the front cover 320 is viewed from above, the POL 432 may have an opening (e.g., the opening 4321 in FIG. 4) to improve the optical transmittance of the camera module 500, and this opening may be formed as the first opening OP1 together with the opening of the display panel 431. In another embodiment, the overlying adhesive member 410 may also have an at least partially removed portion corresponding to the first opening OP1. When the front cover 320 is viewed from above, the additional layer 440 may have the second opening OP2 formed in a region overlapping with the plurality of lenses 530. The first opening OP1 and the second opening OP2 may be formed to have the same, substantially the same center, or a deviation within 5% of the diameter of op2 (i.e., centers on a common axis or substantially common axis) and different sizes. According to an embodiment, the first opening OP1 may be formed smaller than the second opening OP2. According to an embodiment, the first opening OP1 and the second opening OP2 may be formed in concentric circles having the same, or substantially the same center, or centers with a deviation of less than 5% of the diameter of opt, and different sizes. The camera module 500 may be disposed such that the centers of the plurality of lenses 530 coincide, substantially coincide, or coincide within a deviation of 5% of op2, with the centers of the first and second openings OP1 and OP2. The display 400 may have a resultant opening of a stepped structure through the connection of the first and second openings OP1 and OP2, which have different sizes and are formed in the display panel 431 (including the POL 432) and the additional layer 440, respectively.

According to certain embodiments, the openings OP1 and OP2 of the display 400 may be formed through a laser cutting process. According to an embodiment, inner surfaces of the openings OP1 and OP2 and/or the printed region 322 may be formed through an alignment process and completed through a cleaning process. The display 400 having the openings OP1 and OP2 may be first attached to the first support member 311 of the lateral member 310. The camera module 500 may be aligned with the openings OP1 and OP2 exposed through the through-hole 301 of the first support member 311 and then attached to the rear surface of the first support member 311 through the adhesive member 312.

According to certain embodiments, the camera module 500 may include the first lens 531 disposed through the lens housing 520 and located closest to the display panel 431 among the plurality of lenses 530. The first lens 531 may be disposed, at least in part, within or nearby the second opening OP2. The first lens 531 may be disposed to coincide with an upper surface 521 of the lens housing 520 or protrude at least partially from the upper surface 521. It is noted that a flat portion of lens 531 is unobstructed in the upward direction by the lens housing 520. The stepped structure of the first and second openings OP1 and OP2 of the display 400 supports the first lens 531 as the lens housing 520 terminates at upper surface 521 to induce the angle of view. Therefore, the size of the first opening OP1 formed in the display panel 431 may be reduced, which may help to reduce the camera-exposed portion 321 of the front cover 320.

FIGS. 6 to 9 are cross-sectional views showing a light absorbing structure disposed in openings OP1 and OP2 of a display 400 according to certain embodiments of the disclosure. The printed region 322 is disposed around OP1 to prevent reflection.

In describing FIGS. 6 to 9, the same reference numerals are used to refer to the same elements as those shown in FIGS. 5A and 5B, and redundant description may be omitted.

According to certain embodiments, in the electronic device 300, the first lens 531 is spaced apart from the front cover 320, and a structure inducing the angle of view of the first lens 531 is formed through the stepped structure of the openings OP1 and OP2, which have different diameters and are formed in the display 400. This may cause a problem that light reflected from the side of the first lens 531 and/or from the top of the lens housing 520 is visually recognized from the outside through a camera-exposed portion (e.g., the camera-exposed portion 321 in FIG. 3). Accordingly, the electronic device 300 may need to have an anti-reflective structure that manages the reflectance of the camera module 500 disposed through the camera-exposed portion 321 and the openings OP1 and OP2 of the display 400 to a particular value or less (e.g., 0.3% or less).

Figure 6:
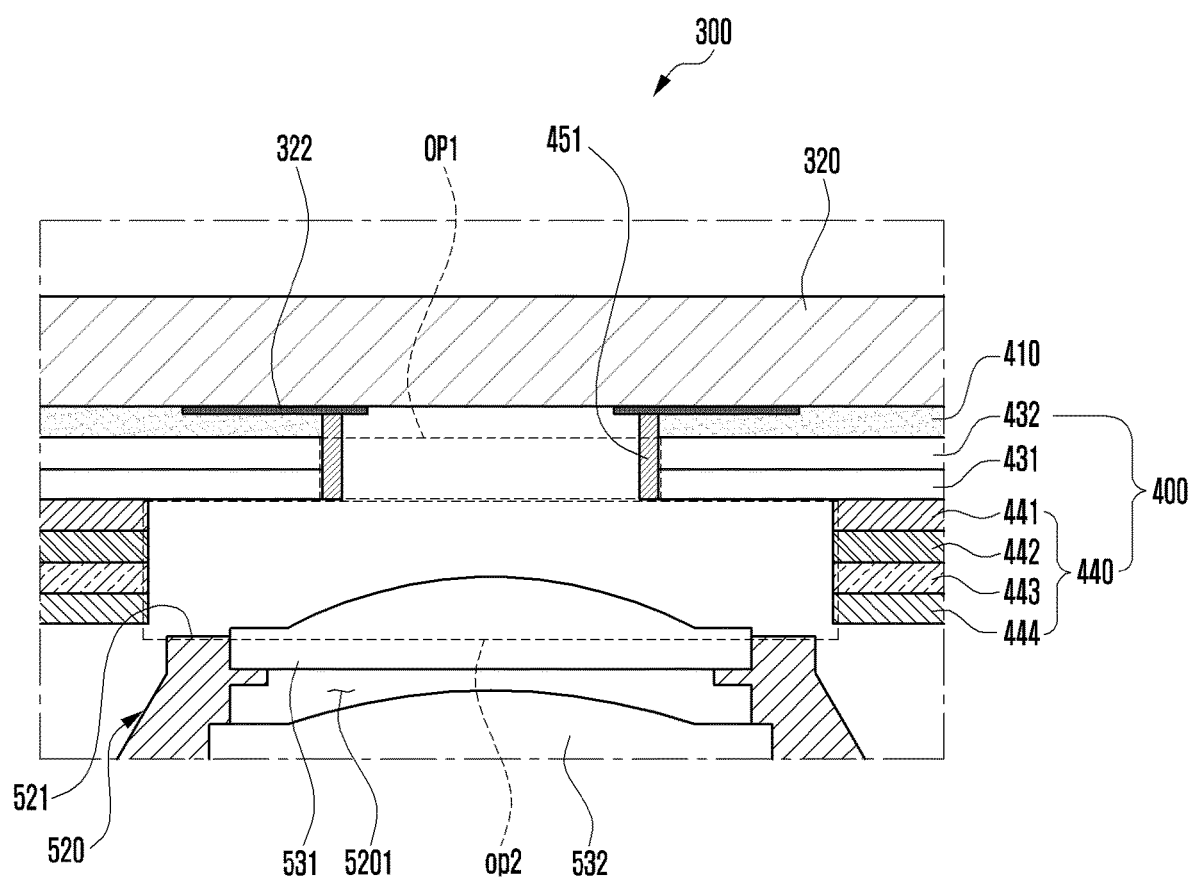
FIGS. 6 to 9 are cross-sectional views showing a light absorbing structure disposed in openings of a display according to certain embodiments of the disclosure.

Referring to FIG. 6, the electronic device 300 may include the display 400 disposed on the rear surface of the front cover 320 and having the openings OP1 and OP2, and the camera module 500 disposed in the inner space of the electronic device 300 to face the openings OP1 and OP2. According to an embodiment, the openings OP1 and OP2 may include the first opening OP1 formed through the display panel 431 and/or the POL 432, and the second opening OP2 formed through the at least one additional layer 440. The second opening OP2 may be overlapped with the first opening OP1, have the same center as the first opening OP1, and be larger than the first opening OP1. According to an embodiment, the electronic device 300 may include a light absorbing structure, also referred to as an overlay, disposed on the inner surface of the first opening OP1 of the display 400 to absorb light received from the outside. According to an embodiment, the light absorbing structure may include an anti-reflection (AR) coating layer 451 disposed on the inner surface of the first opening OP1. In another embodiment, the AR coating layer 451 may be extended from the first opening OP1 to the inner surface of the second opening OP2.

Figure 7:
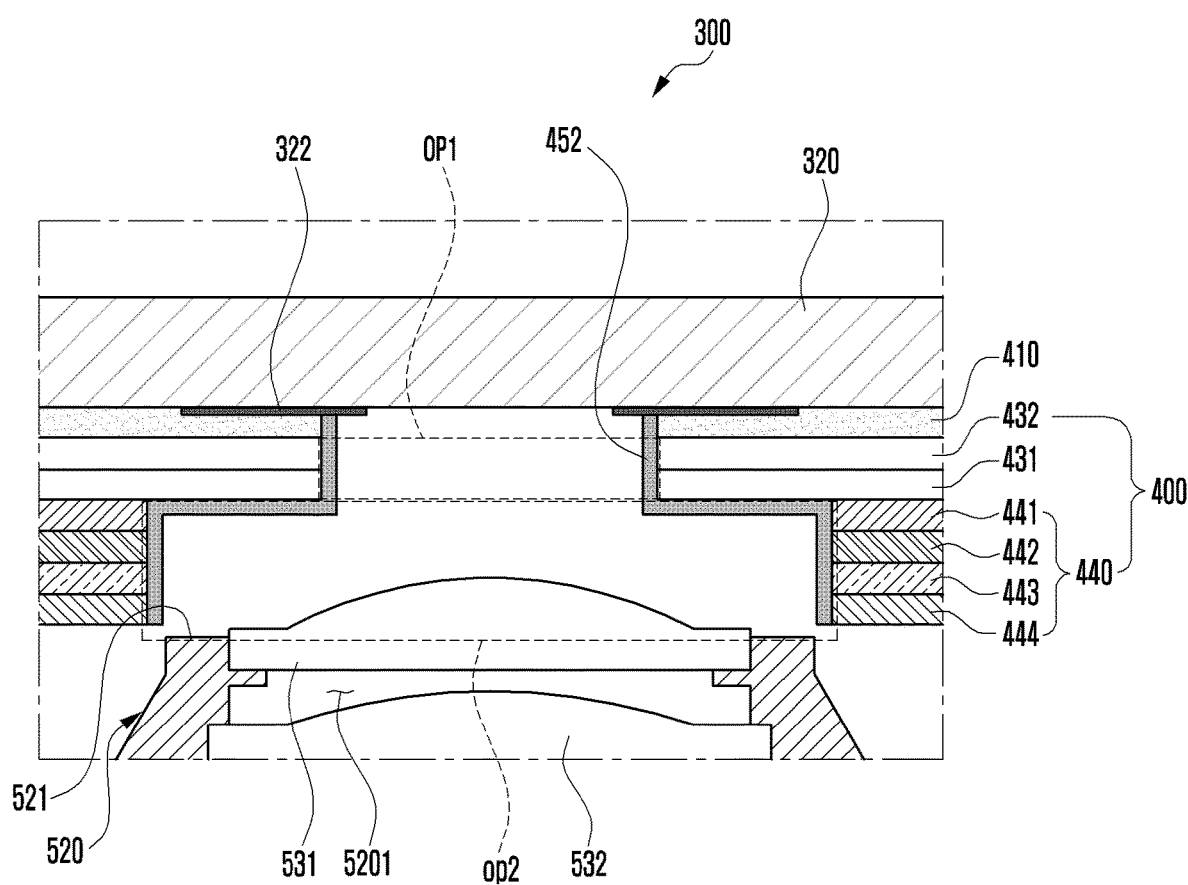

Referring to FIG. 7, the light absorbing structure may include a black resin layer 452 coated on the inner surface of the first opening OP1. The black resin layer 452 may be extended from the printed region 322 formed on the rear surface of the front cover 320 to the inner surface of the second opening OP2 through the inner surface of the first opening OP1.

Figure 8:
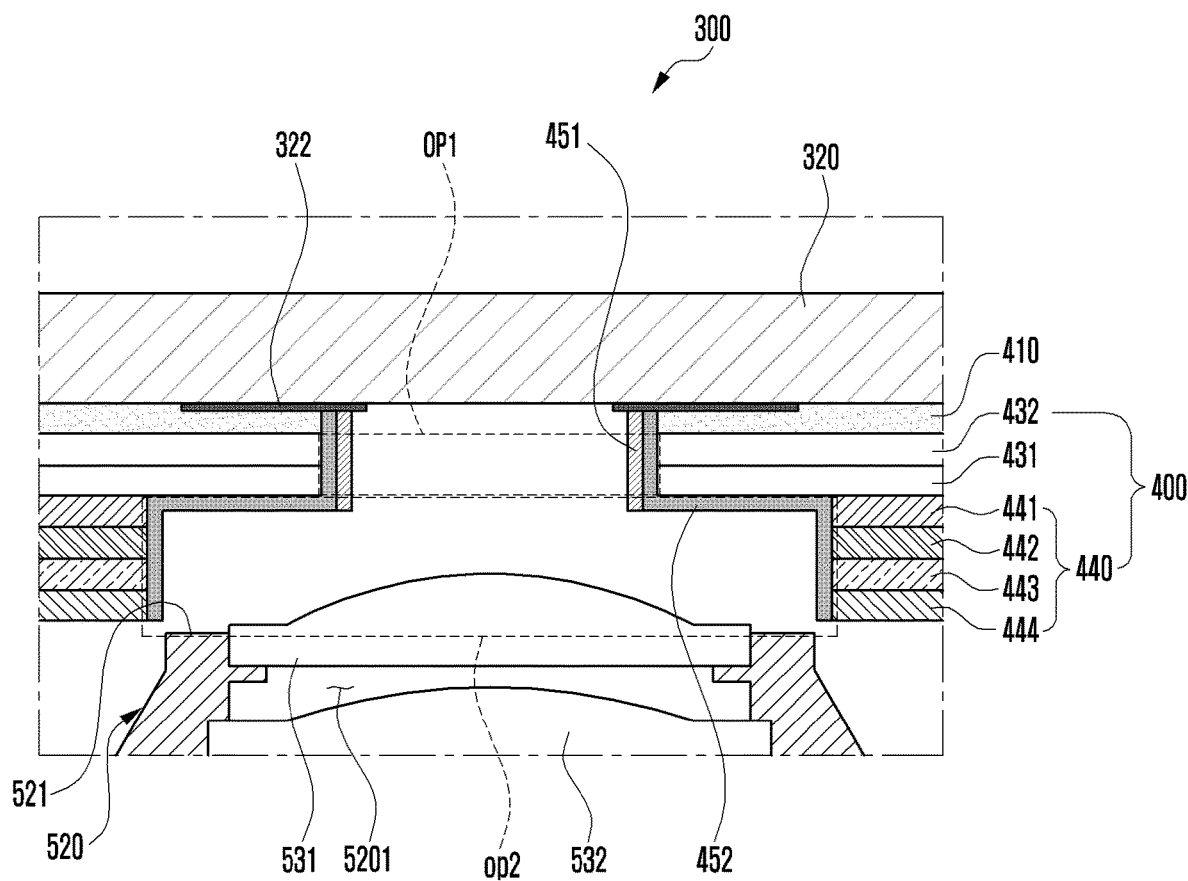

Referring to FIG. 8, the light absorbing structure may include both the AR coating layer 451 and the black resin layer 452 formed together on the inner surfaces of the openings OP1 and OP2. According to an embodiment, after the black resin layer 452 is formed from the inner surface of the first opening OP1 to the inner surface of the second opening OP2, the AR coating layer 451 may be further formed thereon.

Figure 9:
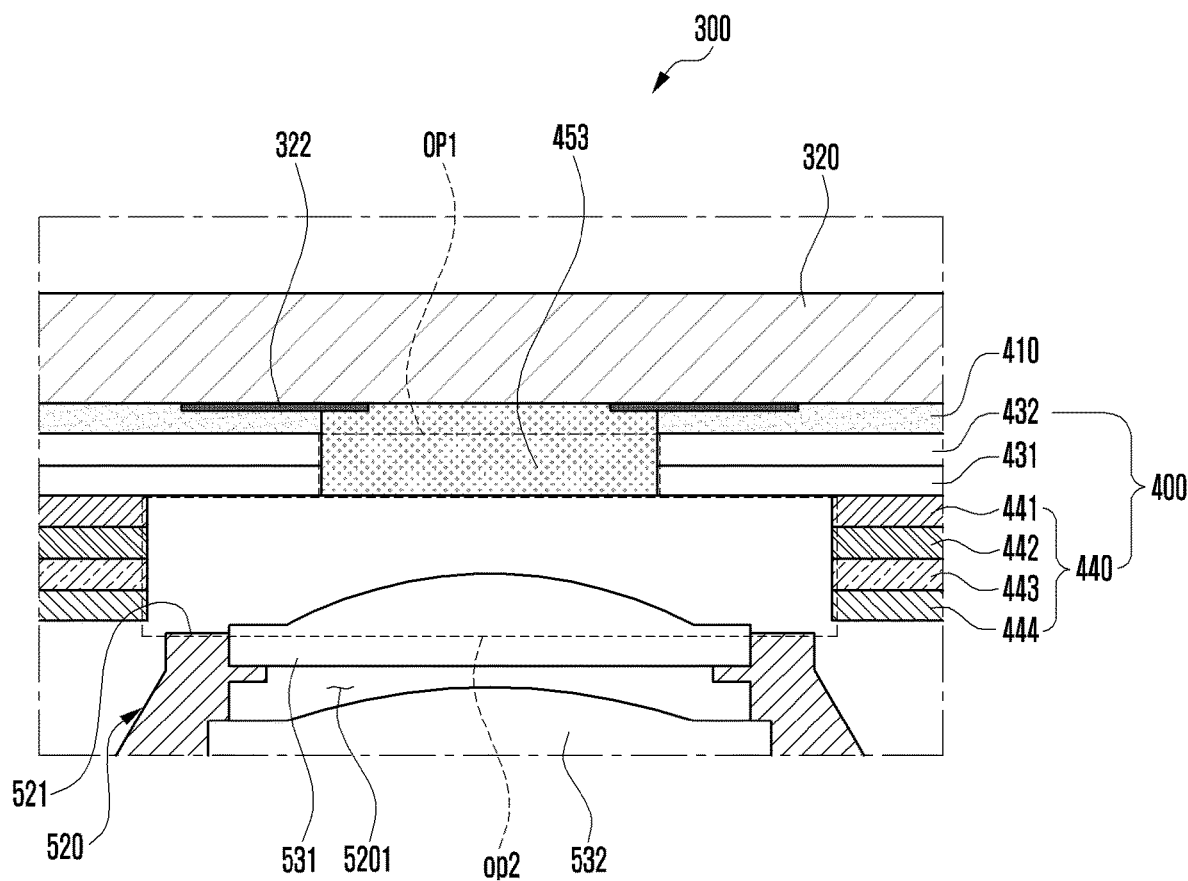

Referring to FIG. 9, the light absorbing structure may include a light absorbing material 453 filled in the first opening OP1 formed at least in the display panel 431. According to an embodiment, the light absorbing material 453 may be filled in the first opening OP1 formed up to the POL 432 and the adhesive member 410, both of which are attached to the display panel 431. According to an embodiment, the light absorbing material 453 may be filled to be in contact with the rear surface of the front cover 320. According to an embodiment, the light absorbing material 453 may be a material having substantially the same dielectric constant and/or transmittance as the front cover 320.

Figure 10:
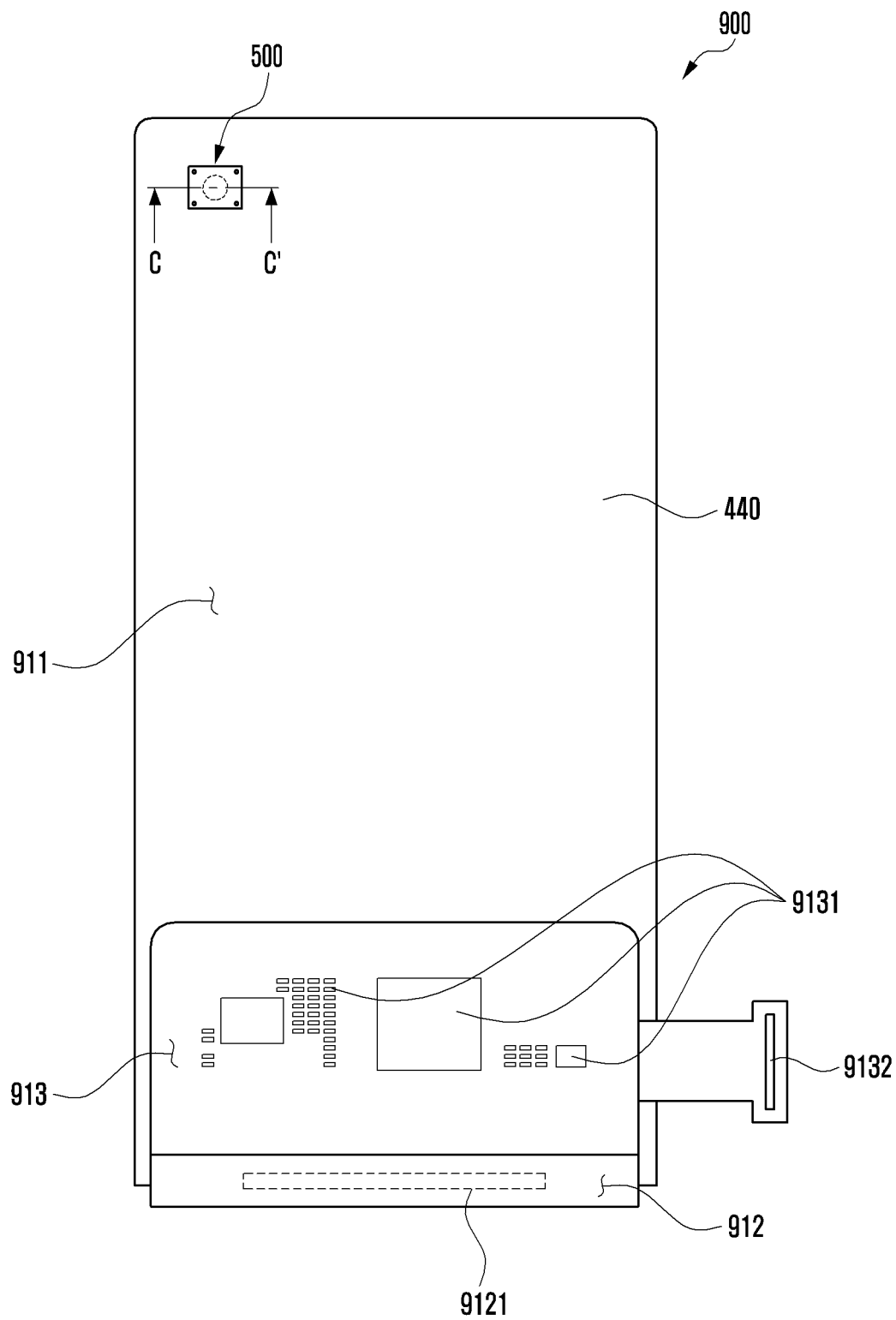
FIG. 10 is a plan view showing a display assembly in which a camera module is disposed on a rear surface of a display according to certain embodiments of the disclosure.
Figure 11:
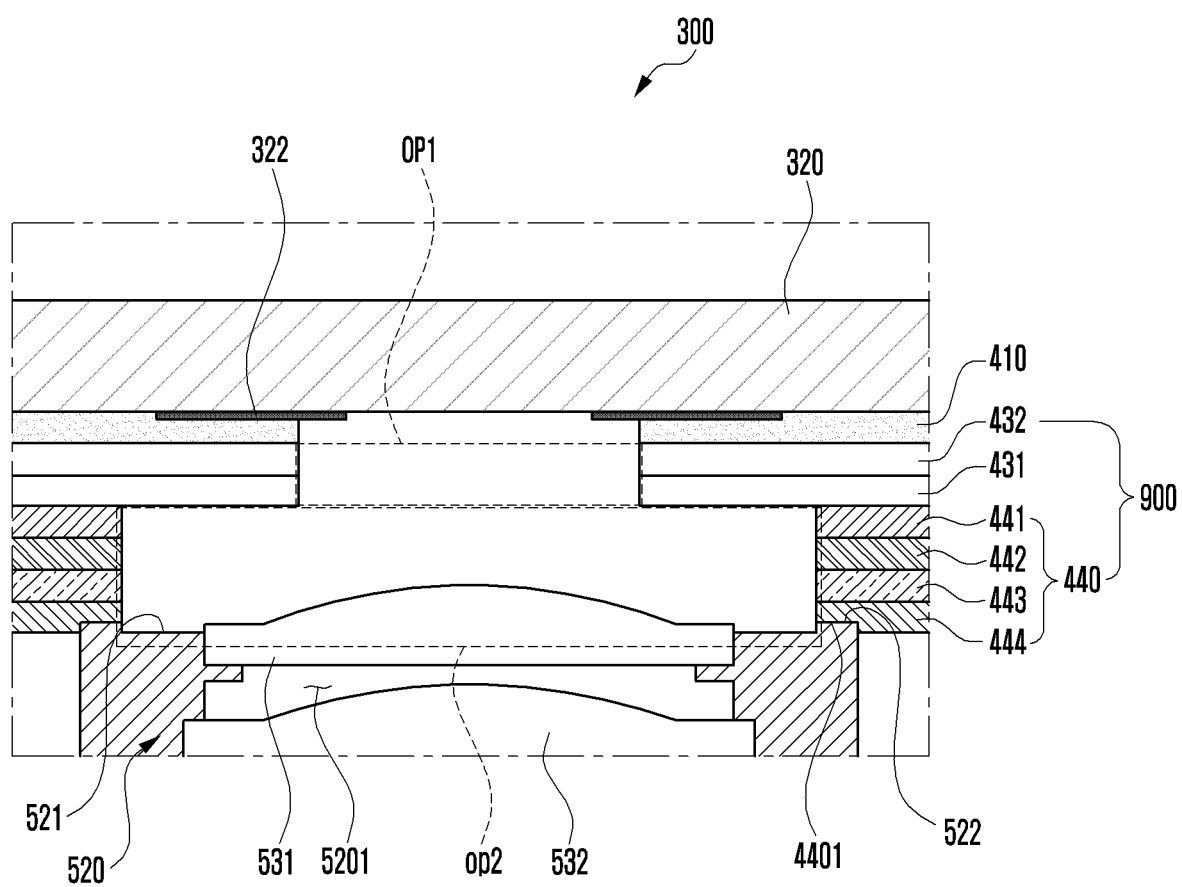
FIG. 11 is a cross-sectional view partially showing the display by being taken along the line C-C' of FIG. 10.

FIG. 10 is a plan view showing a display assembly in which a camera module 500 is disposed on a rear surface of a display 900 according to certain embodiments of the disclosure. FIG. 11 is a cross-sectional view partially showing the display 900 by being taken along the line C-C' of FIG. 10.

The display 900 shown in FIGS. 10 and 11 may be similar, at least in part, to the display 101 shown in FIG. 1 or the display 400 shown in FIGS. 3 and 4, or may include other embodiments of the display.

According to certain embodiments, the camera module 500 may be disposed to be attached to or combined with, while being also aligned with, the rear surface of the display 900. That is, the camera module 500 is provided in the form of a display assembly in which the camera module 500 is aligned on the rear surface of the display 900. Therefore, an alignment process of the camera module 500 through the openings OP1 and OP2 may not be required after the display 900 is mounted in the inner space of the electronic device 300.

Figure 12:
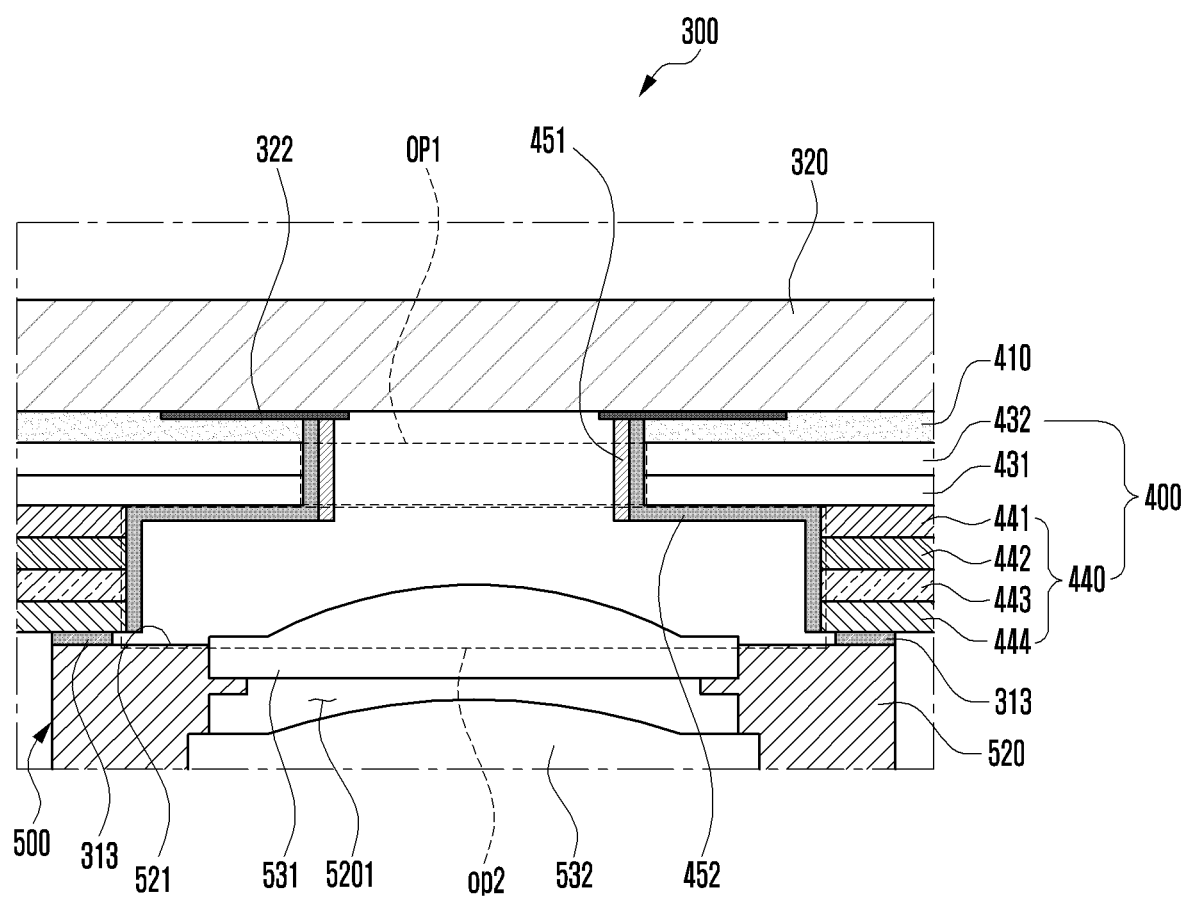
FIG. 12 is a cross-sectional view partially showing a camera module disposed on a rear surface of a display according to certain embodiments of the disclosure.

Referring to FIGS. 11 and 12, the display 900 may include a flat portion 911, a bendable portion 912 folded from the flat portion 911 to the rear surface of the display 900, and a flexible printed circuit board (FPCB) 913 electrically connected to the bendable portion 912. According to an embodiment, the display 900 may include a control circuit 9121 mounted on the bendable portion 912. According to an embodiment, the control circuit 9121 may include a display driver IC (DDI) or a touch display driver IC (TDDI) mounted on the bendable portion 912. According to an embodiment, the DDI or TDDI may be mounted on the bendable portion 912 in a chip-on-panel (COP) structure. According to an embodiment, at least a part of the FPCB 913 and the bendable portion 912 may be folded to the rear surface of the display 900 and attached to the additional layer 440 through bonding or taping. According to an embodiment, the display 900 may include a plurality of elements 9131 disposed on the FPCB 913, and an electronic connector 9132 drawn from the FPCB 913 and electrically connected to a printed circuit board (e.g., the PCB 340 in FIG. 3) of an electronic device (e.g., the electronic device 300 in FIG. 3). According to an embodiment, the plurality of elements 9131 may include a touch IC, a flash memory for display, an ESD protection diode, and/or a decoupling capacitor.

According to certain embodiments, the display 900 may contain the camera module 500 disposed at least in part under the additional layer 440 (e.g., a conductive member) thereof. According to an embodiment, the camera module 500 may be disposed at a position corresponding to the openings OP1 and OP2 formed in the display panel 431 and the additional layer 440. According to an embodiment, when the display 900 is disposed using the lateral member 310, the camera module 500 may be disposed to be further supported by at least a portion (e.g., the first support member 311) of the lateral member 310 between the lateral member 310 and the display 900.

According to certain embodiments, the electronic device 300 may include an alignment structure in which the plurality of lenses 530 of the camera module 500 are aligned with the openings OP1 and OP2 of the display 900 on the rear surface of the display 900. For example, the camera module 500 may include at least one alignment protrusion 522 protruded from the lens housing 520, and the additional layer 440 of the display 900 may include at least one alignment groove 4401 for accommodating the at least one alignment protrusion 522. In this case, only engaging the alignment protrusion 522 of the lens housing 520 of the camera module 500 with the alignment groove 4401 of the additional layer 440 of the display 900 can accomplish the alignment between the plurality of lenses 530 and the openings OP1 and OP2.

FIG. 12 is a cross-sectional view partially showing a camera module 500 disposed on a rear surface of a display 400 according to certain embodiments of the disclosure.

In describing FIG. 12, the same reference numerals are used to refer to the same elements as those (e.g., the AR coating layer 451 and the black resin layer 452) of the display shown in FIG. 8, and redundant description may be omitted.

Referring to FIG. 12, the camera module 500 does not have the above-described camera housing (510 in FIG. 5A) and includes the lens housing 520 for supporting at least one lens 531 and 532. According to an embodiment, the camera module 500 may be disposed in a manner that the lens housing 520 is aligned with the opening OP2 of the display 400 through the through-hole (e.g., the through-hole 301 in FIGS. 3 and 5A) of the first support member 311 and then attached to the rear surface of the display 400 through an attachment process using bonding 313 or taping.

According to certain embodiments, a material used for the bonding 313 or taping may include at least one of an epoxy resin, a rubber resin, a silicone resin, an acrylic resin, a thermosetting resin, a thermoplastic resin, polyvinyl chloride (PVC), polyethylene (PE), polypropylene (PP), or polyethylene terephthalate (PET).

According to certain embodiments, the diameter of the first opening OP1 formed in the display 400 may be smaller than the diameter of the first lens 531 disposed closest to the display 400. In addition, the diameter of the second opening OP2 formed in the display 400 may be larger than the diameter of the first lens 531 disposed closest to the display 400.

According to certain embodiments, the camera module 500 may be electrically connected to the PCB (e.g., the PCB 340 in FIG. 3) and also disposed on the camera alignment structure (e.g., the second support member 360 in FIG. 3).

According to certain embodiments, the camera module 500 may be mounted on the PCB (e.g., the PCB 340 in FIG. 3) and also aligned with the second opening OP2 formed in the display 400.

According to certain embodiments of the disclosure, the first lens of the camera module disposed closest to the display is disposed to be protruded from the lens housing toward the display, and a structure for guiding the angle of view of the first lens is implemented through the stepped structure of the openings formed in the display. It is therefore possible to reduce the size of the opening formed in the display and the size of the camera-exposed portion formed in the cover member.

According to certain embodiments of the disclosure, an electronic device (e.g., the electronic device 100 in FIG. 1) may include a housing (e.g., the housing 110 in FIG. 1), a display (e.g., the display 400 in FIG. 5A), and a camera module (e.g., the camera module 500 in FIG. 5A). The housing may have an inner space. The display may be disposed in the inner space of the housing to be visible from an outside, and may include a display panel (e.g., the display panel 431 in FIG. 5A) having a first opening (e.g., the first opening OP1 in FIG. 5A), and at least one additional layer (e.g., the additional layer 440 in FIG. 5A) stacked under the display panel and having a second opening (e.g., the second opening OP2 in FIG. 5A) corresponding to the first opening and formed to be larger than the first opening. The camera module may be disposed in the inner space to face the second opening, and may include a lens housing (e.g., the lens housing 520 in FIG. 5A), a plurality of lenses (e.g., the lenses 530 in FIG. 5A) disposed in and supported by the lens housing, and at least one image sensor (e.g., the image sensor 540 in FIG. 5A) aligned with the plurality of lenses. In the electronic device, a first lens (e.g., the first lens 531 in FIG. 5A) closest to the display panel among the plurality of lenses may be disposed to coincide with an upper surface (e.g., the upper surface 521 in FIG. 5A) of the lens housing or to be protruded at least in part from the upper surface of the lens housing.

According to certain embodiments, the camera module may be disposed such that centers of the plurality of lenses are aligned with centers of the first and second openings.

According to certain embodiments, the electronic device may further include a light absorbing structure disposed on an inner surface of the first opening or from the inner surface of the first opening to an inner surface of the second opening.

According to certain embodiments, the light absorbing structure may include an anti-reflection coating layer (e.g., the AR coating layer 451 in FIG. 6) disposed on the inner surface of the first opening.

According to certain embodiments, the light absorbing structure may include a black resin layer (e.g., the black resin layer 452 in FIG. 7) coated on the inner surfaces of the first and second openings.

According to certain embodiments, the light absorbing structure may include a black resin layer coated on the inner surfaces of the first and second openings, and an anti-reflection coating layer disposed on the black resin layer at least in the first opening.

According to certain embodiments, the electronic device may further include a front cover (e.g., the front cover 320 in FIG. 5A) surrounding at least in part the inner space of the housing, and the display may be disposed to be stacked on a rear surface of the front cover.

According to certain embodiments, the housing may further include a support member (e.g., the first support member 311 in FIG. 3) extended at least in part into the inner space and having a first surface (e.g., the first surface 3101 in FIG. 3) facing the front cover and a second surface (e.g., the second surface 3102 in FIG. 3) facing opposite to the first surface, and the camera module may be supported by the support member.

According to certain embodiments, the support member may have a through-hole (e.g., the through-hole 301 in FIG. 3) formed at a position corresponding to the second opening, and the camera module may be disposed on the second surface of the support member such that the plurality of lenses face the second opening through the through-hole.

According to certain embodiments, the camera module may be aligned with and attached to the second surface of the support member by bonding or taping.

According to certain embodiments, the camera module may be disposed such that the lens housing is supported by the first surface of the support member between the display and the support member.

According to certain embodiments, the display may further include a polarizer (POL, e.g., the POL 432 in FIG. 4) stacked on the display panel and having an opening substantially same as the first opening, and a touch panel (e.g., the touch panel 433 in FIG. 4) disposed on the POL or between the POL and the display panel.

According to certain embodiments, the additional layer may include at least one polymer member (e.g., the polymer members 441 and 442 in FIG. 4) stacked under the display panel, at least one functional member (e.g., the functional member 443 in FIG. 4) stacked under the at least one polymer member, and a conductive member (e.g., the conductive member 444 in FIG. 4) stacked under the at least one functional member.

According to certain embodiments, the camera module may be disposed such that the lens housing is fixed to the additional layer of the display and the plurality of lenses face the second opening.

According to certain embodiments, the electronic device may further include an alignment structure including at least one alignment protrusion (e.g., the alignment protrusion 522 in FIG. 11) formed on the lens housing and at least one alignment groove (e.g., the alignment groove 4401 in FIG. 11) formed in the additional layer, and the camera module may be aligned with the first and second openings through an engagement structure in which the alignment protrusion is inserted into the alignment groove.

According to certain embodiments, the camera module may further include a camera housing (e.g., the camera housing 510 in FIG. 5A) disposed in the inner space and accommodating at least a portion of the lens housing, and the lens housing may be movable through a driving mechanism disposed in the camera housing such that a distance from the display panel is variable.

According to certain embodiments of the disclosure, an electronic device (e.g., the electronic device 100 in FIG. 1) may include a housing (e.g., the housing 110 in FIG. 1), a display (e.g., the display 400 in FIG. 5A), and a camera module (e.g., the camera module 500 in FIG. 5A). The housing may include a support member (e.g., the first support member 311 in FIG. 5A) extended into an inner space thereof. The display may be disposed in the inner space to be visible from an outside, and may include a display panel (e.g., the display panel 431 in FIG. 5A) having a first opening (e.g., the first opening OP1 in FIG. 5A), and at least one additional layer (e.g., the additional layer 440 in FIG. 5A) stacked under the display panel and having a second opening (e.g., the second opening OP2 in FIG. 5A) corresponding to the first opening and formed to be larger than the first opening. The camera module may be disposed in the inner space to face the second opening while being supported by at least a portion of the support member, and may include a lens housing (e.g., the lens housing 520 in FIG. 5A), a plurality of lenses (e.g., the lenses 530 in FIG. 5A) disposed in and supported by the lens housing, and at least one image sensor (e.g., the image sensor 540 in FIG. 5A) aligned with the plurality of lenses. In the electronic device, a first lens (e.g., the first lens 531 in FIG. 5A) closest to the display panel among the plurality of lenses may be disposed to coincide with an upper surface (e.g., the upper surface 521 in FIG. 5A) of the lens housing or to be protruded at least in part from the upper surface of the lens housing.

According to certain embodiments, the camera module may be aligned with the second opening and attached to the support member through an adhesive member (e.g., the adhesive member 312 in FIG. 5A).

According to certain embodiments of the disclosure, an electronic device (e.g., the electronic device 100 in FIG. 1) may include a housing (e.g., the housing 110 in FIG. 1), a display (e.g., the display 400 in FIG. 5A), and a camera module (e.g., the camera module 500 in FIG. 5A). The housing may have an inner space. The display may be disposed in the inner space of the housing to be visible from an outside, and may include a display panel (e.g., the display panel 431 in FIG. 5A) having a first opening (e.g., the first opening OP1 in FIG. 5A), and at least one additional layer (e.g., the additional layer 440 in FIG. 5A) stacked under the display panel and having a second opening (e.g., the second opening OP2 in FIG. 5A) corresponding to the first opening and formed to be larger than the first opening. The camera module may be disposed in the inner space to face the second opening, and may include a lens housing (e.g., the lens housing 520 in FIG. 5A), a plurality of lenses (e.g., the lenses 530 in FIG. 5A) disposed in and supported by the lens housing, and at least one image sensor (e.g., the image sensor 540 in FIG. 5A) aligned with the plurality of lenses. The electronic device may further include a light absorbing structure disposed on an inner surface of the first opening or from the inner surface of the first opening to an inner surface of the second opening.

According to certain embodiments, the light absorbing structure may include a black resin layer (e.g., the black resin layer 452 in FIG. 7) coated on the inner surfaces of the first and second openings, and an anti-reflection coating layer (e.g., the AR coating layer 451 in FIG. 6) disposed on the black resin layer at least in the first opening.

While the disclosure has been particularly shown and described with reference to exemplary embodiments thereof, it will be understood by those skilled in the art that various changes in form and details may be made therein without departing from the scope of the subject matter as defined by the appended claims.

What is claimed is:

1. An electronic device, comprising:
   a housing;
   a display disposed in an inner space of the housing and visible from an outside of the housing, the display comprising:
   a display panel having a first opening, and
   at least one additional layer stacked under the display panel, and having a second opening corresponding to and larger than the first opening; and
   a camera module disposed in the inner space under the at least one additional layer, and facing the second opening, the camera module further comprising:
   a lens housing,
   a plurality of lenses disposed in and supported by the lens housing, the plurality of lenses comprising a first lens closest to the display panel, and
   at least one image sensor aligned with the plurality of lenses,
   wherein the first lens is disposed to at least partially protrude from an upper surface of the lens housing and into the second opening.

2. The electronic device of claim 1, wherein the camera module is disposed such that centers of the plurality of lenses are aligned with centers of the first and second openings,
   wherein the display includes an adhesive layer, a polarizer layer, in addition to the display panel, and the at least one additional layer of the display includes a polymer layer and a conductive layer, and
   wherein the first opening is formed in the adhesive layer and the polarizer layer in addition to the display panel of the display, and the second opening is formed in the polymer layer and the conductive layer of the display.

3. The electronic device of claim 1, further comprising:
   a light absorbing structure disposed on an inner surface of the first opening or from the inner surface of the first opening to an inner surface of the second opening.

4. The electronic device of claim 3, wherein the light absorbing structure includes an anti-reflection coating layer disposed on the inner surface of the first opening.

5. The electronic device of claim 3, wherein the light absorbing structure includes a black resin layer coated on the inner surfaces of the first and second openings.

6. The electronic device of claim 3, wherein the light absorbing structure includes:
   a black resin layer coated on the inner surfaces of the first and second openings, and
   an anti-reflection coating layer disposed on the black resin layer at least in the first opening.

7. The electronic device of claim 1, further comprising:
   a front cover surrounding at least in part the inner space of the housing,
   wherein the display is disposed to be stacked on a rear surface of the front cover and visible through the front cover.

8. The electronic device of claim 7, wherein the housing further includes a support member extended at least in part into the inner space and wherein the camera module is supported by the support member.

9. The electronic device of claim 8, wherein the support member has a first surface facing the front cover and a second surface facing opposite to the first surface, and a through-hole formed at a position corresponding to the second opening, and wherein the camera module is disposed on the second surface of the support member such that the plurality of lenses face the second opening through the through-hole.

10. The electronic device of claim 9, wherein the camera module is aligned with and attached to the second surface of the support member by bonding or taping.

11. The electronic device of claim 8, wherein the camera module is disposed such that the lens housing is supported by the first surface of the support member between the display and the support member.

12. The electronic device of claim 1, wherein the display further includes:
a polarizer (POL) stacked above the display panel and having an opening substantially same as the first opening, and
a touch panel disposed on the POL or between the POL and the display panel.

13. The electronic device of claim 1, wherein the additional layer includes:
at least one polymer member stacked under the display panel,
at least one functional member stacked under the at least one polymer member, and
a conductive member stacked under the at least one functional member.

14. The electronic device of claim 1, wherein the camera module is disposed such that the lens housing is fixed to the additional layer of the display and the plurality of lenses face the second opening.

15. The electronic device of claim 14, further comprising:
an alignment structure including at least one alignment protrusion formed on the lens housing and at least one alignment groove formed in the additional layer, and
wherein the camera module is aligned with the first and second openings through an engagement structure in which the alignment protrusion is inserted into the alignment groove.

16. The electronic device of claim 1, wherein the camera module further includes a camera housing disposed in the inner space and accommodating at least a portion of the lens housing, and
wherein the lens housing is movable through a driving mechanism disposed in the camera housing such that a distance from the display panel is variable.

17. An electronic device, comprising:
a housing including a support member extended into an inner space thereof;
a display disposed in the inner space to be visible from an outside, and including:
a display panel having a first opening, and
at least one additional layer stacked under the display panel and having a second opening corresponding to and larger than the first opening; and
a camera module disposed in the inner space under the at least one additional layer and facing the second opening while being supported by at least a portion of the support member, and including:
a lens housing,
a plurality of lenses disposed in and supported by the lens housing, the plurality of lenses comprising a first lens closest to the display panel, and
at least one image sensor aligned with the plurality of lenses,
wherein the first lens is disposed to at least partially protrude from an upper surface of the lens housing and into the second opening.

18. The electronic device of claim 17, wherein the camera module is substantially aligned with the second opening and attached to the support member through an adhesive member.

19. An electronic device, comprising:
a housing having an inner space;
a display disposed in the inner space of the housing and visible from an outside of the housing, and including:
a display panel having a first opening, and
at least one additional layer stacked under the display panel and having a second opening corresponding to and larger than the first opening; and
a camera module disposed in the inner space to face the second opening, and including:
a lens housing,
a plurality of lenses disposed in and supported by the lens housing, the plurality of lenses comprising a first lens closest to the display panel, and
at least one image sensor aligned with the plurality of lenses,
wherein the electronic device further comprises a light absorbing structure disposed on an inner surface of the first opening or from the inner surface of the first opening to an inner surface of the second opening, and
wherein the first lens is disposed to at least partially protrude from an upper surface of the lens housing and into the second opening.

20. The electronic device of claim 19, wherein the light absorbing structure includes:
a black resin layer coated on the inner surfaces of the first and second openings, and
an anti-reflection coating layer disposed on the black resin layer at least in the first opening.

* * * * *